Aug. 4, 1942.  S. B. BERKELEY  2,291,679
GREASING IMPLEMENT
Filed Dec. 7, 1940
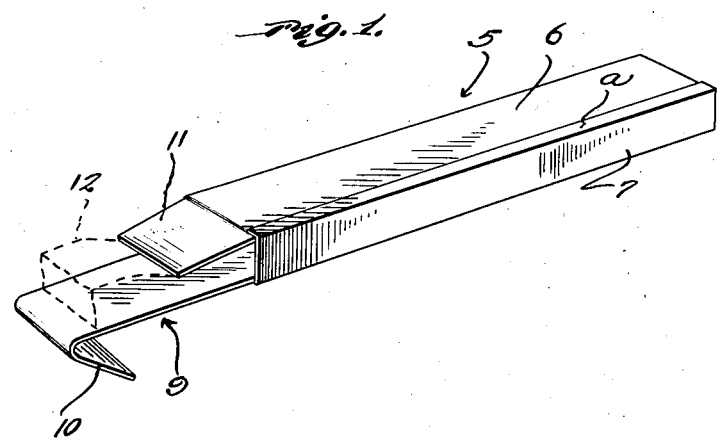
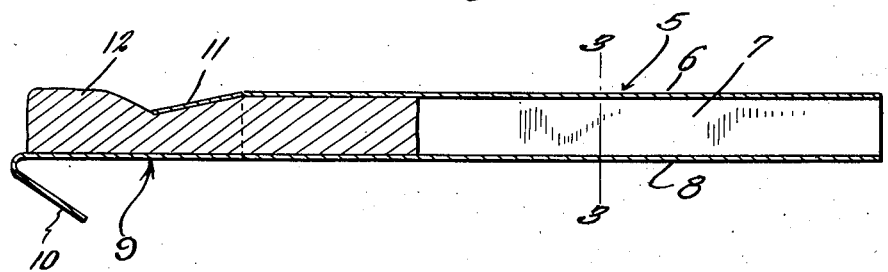
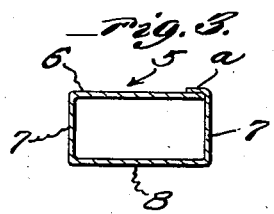
Inventor
Scott B. Berkeley
By Clarence A. O'Brien
Attorney Patented Aug. 4, 1942

2,291,679

UNITED STATES PATENT OFFICE 2,291,679

GREASING IMPLEMENT

Scott B. Berkeley, Goldsboro, N. C.

Application December 7, 1940, Serial No. 369,109

1 Claim. (Cl. 65—12)

This invention relates to new and useful improvements in means for conveniently greasing various items such as waffle irons, pans and like utensils.

The principal object of the present invention is to provide a holder for strip fat, which can be conveniently fed from the holder and cut off as needed.

Another important object of the invention is to provide a greasing implement which in use need not occasion the soiling of hands, table cloths or other structure by the fat contained therein.

Still another important object is to provide a strip fat holder on which detent means is provided to hold the strip fat against accidental shifting in the holder.

Various other important objects and advantages of the invention will become apparent to the reader of the following specification.

In the drawing:

Figure 1 represents a perspective view of the holder showing in broken lines a strip of fat held therein.

Figure 2 is a longitudinal sectional view through the holder and a strip of fat held therein.

Figure 3 is a cross section on the line 3—3 of Figure 2.

Referring to the drawing wherein like numerals designate like parts, it can be seen that the entire holder can be stamped from one sheet of metal, or in fact, any other suitable material.

The sheet is formed to provide a body 5 consisting of a top wall 6, side walls 7, and a bottom wall 8. Due to the fact that it is preferable that the device be constructed from one piece of sheet metal, one side wall 7 will have its upper edge portion flanged over one longitudinal edge portion of the top wall 6 as at $a$ and soldered or otherwise secured thereto.

Projecting from the forward portion of the body 5 is a tongue generally referred to by numeral 9. This tongue is provided at its outer end with a backwardly disposed oblique heel portion 10, which when the device is set upon a table or other supporting structure will maintain the tongue 9 raised so that table cloths, table surfaces or other structures will not become greased.

The sheet metal of which the entire implement is constructed is of a spring consistency.

The top 6 of the body portion at its end adjacent the tongue 9 is provided with a downwardly converging lip 11.

As shown in Figures 1 and 2, numeral 12 denotes a strip of fat, which in some localities is known as "fat back." The fat may or may not have rind thereon, but is disposed longitudinally in the body 5 with one end protruding onto the tongue 9 and held thereon by the spring lip 11.

In the use of the implement, the same can be inverted from that position shown in Figure 1 for the purpose of directly greasing pans, waffle irons and like utensils. On the other hand, if a chunk of fat is desired, a piece can be cut off of the end of the strip 12, and by a knife or fork engaged against the strip of fat, the fat can be conveniently pulled out onto the tongue 9 to make up for the piece cut off.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A greasing implement comprising a hollow handle for containing a strip of fat to be slid out of one end thereof to expose a portion for use in greasing, a tongue extending from said end of the handle and one side thereof for backing the exposed portion of the strip during greasing and forming a support on which said exposed portion may be cut off the strip for replacement by an unused portion, and a resilient lip extending from said end of the handle over the tongue, said lip being shorter than said tongue and converging toward the same to hold the strip against creeping endwise out of the handle and to permit free use of the exposed portion while holding the latter against said tongue.

SCOTT B. BERKELEY.